United States Patent
Turpen et al.

(10) Patent No.: US 9,690,021 B2
(45) Date of Patent: Jun. 27, 2017

(54) PHOTOCHROMIC OPTICAL ARTICLE HAVING ALLOPHANATE PROTECTIVE COATING AND PROCESS FOR MAKING SAME

(71) Applicant: Transitions Optical, Inc., Pinellas Park, FL (US)

(72) Inventors: Joseph David Turpen, Safety Harbor, FL (US); Cynthia Kutchko, Pittsburgh, PA (US); Glen Todd Owens, St. Petersburg, FL (US); Vitawat Lahsangah, St. Petersburg, FL (US); Jerry L. Koenig, II, Largo, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 15/026,647

(22) PCT Filed: Oct. 3, 2014

(86) PCT No.: PCT/US2014/058932
§ 371 (c)(1),
(2) Date: Apr. 1, 2016

(87) PCT Pub. No.: WO2015/054036
PCT Pub. Date: Apr. 16, 2015

(65) Prior Publication Data
US 2016/0238758 A1    Aug. 18, 2016

Related U.S. Application Data

(60) Provisional application No. 61/890,045, filed on Oct. 11, 2013, provisional application No. 61/890,055, (Continued)

(51) Int. Cl.
*G02F 1/03* (2006.01)
*G02B 5/23* (2006.01)
(Continued)

(52) U.S. Cl.
CPC ............ *G02B 5/223* (2013.01); *B05C 5/02* (2013.01); *B05C 11/08* (2013.01);
(Continued)

(58) Field of Classification Search
CPC . G02B 5/223; G02B 5/23; G02B 1/14; C09D 175/06; C09D 5/32; C08J 7/042;
(Continued)

(56) References Cited

U.S. PATENT DOCUMENTS

| 8,409,714 B2* | 4/2013 | Mori | C09D 5/002 |
| | | | 359/241 |
| 2016/0243579 A1* | 8/2016 | Koenig, II | B29D 11/00884 |
| 2016/0245967 A1* | 8/2016 | Koenig, II | B29D 11/00884 |

* cited by examiner

Primary Examiner — Loha Ben
(74) Attorney, Agent, or Firm — The Webb Law Firm

(57) ABSTRACT

A photochromic optical article is provided, which includes: an optical substrate; a photochromic layer over a surface of the optical substrate, wherein the photochromic layer includes a photochromic compound; and a protective layer over the photochromic layer, wherein the protective layer includes a matrix that includes residues of an ethylenically unsaturated radically polymerizable material that includes at least one allophanate group. A method of forming the photochromic optical article is also provided.

18 Claims, 2 Drawing Sheets

Related U.S. Application Data filed on Oct. 11, 2013, provisional application No. 61/890,059, filed on Oct. 11, 2013.

(51) Int. Cl.

| | | |
|---|---|---|
| *C08J 7/04* | (2006.01) | |
| *C08J 7/12* | (2006.01) | |
| *C09D 175/06* | (2006.01) | |
| *C09D 5/32* | (2006.01) | |
| *G02B 1/14* | (2015.01) | |
| *G02C 7/10* | (2006.01) | |
| *G02B 5/22* | (2006.01) | |
| *B29D 11/00* | (2006.01) | |
| *G03C 1/73* | (2006.01) | |
| *C08G 18/62* | (2006.01) | |
| *C08G 18/78* | (2006.01) | |
| *C08G 18/80* | (2006.01) | |
| *C08G 18/81* | (2006.01) | |
| *C08G 18/22* | (2006.01) | |
| *C08G 18/28* | (2006.01) | |
| *C08G 18/40* | (2006.01) | |
| *C08G 18/44* | (2006.01) | |
| *B05C 11/08* | (2006.01) | |
| *B05C 11/10* | (2006.01) | |
| *B05D 3/14* | (2006.01) | |
| *B05D 7/00* | (2006.01) | |
| *C09K 9/02* | (2006.01) | |
| *B05C 5/02* | (2006.01) | |
| *B05C 13/00* | (2006.01) | |
| *B05D 1/00* | (2006.01) | |
| *B05D 3/00* | (2006.01) | |
| *B05D 3/02* | (2006.01) | |

(52) U.S. Cl.
CPC ...... *B05C 11/1036* (2013.01); *B05C 11/1039* (2013.01); *B05C 13/00* (2013.01); *B05D 1/005* (2013.01); *B05D 3/007* (2013.01); *B05D 3/0272* (2013.01); *B05D 3/144* (2013.01); *B05D 7/546* (2013.01); *B29D 11/00884* (2013.01); *C08G 18/227* (2013.01); *C08G 18/289* (2013.01); *C08G 18/4063* (2013.01); *C08G 18/44* (2013.01); *C08G 18/6225* (2013.01); *C08G 18/7831* (2013.01); *C08G 18/7837* (2013.01); *C08G 18/807* (2013.01); *C08G 18/8175* (2013.01); *C08J 7/042* (2013.01); *C08J 7/123* (2013.01); *C09D 5/32* (2013.01); *C09D 175/06* (2013.01); *C09K 9/02* (2013.01); *G02B 1/14* (2015.01); *G02B 5/23* (2013.01); *G02C 7/102* (2013.01); *G03C 1/73* (2013.01); *C08J 2369/00* (2013.01); *C08J 2433/14* (2013.01); *C08J 2475/06* (2013.01); *C09K 2211/14* (2013.01)

(58) Field of Classification Search
CPC .... C08J 7/123; C08J 2369/00; C08J 2433/14; C08J 2475/06; G02C 7/102; B29D 11/00884; C08G 18/227; C08G 18/44; C08G 18/289; C08G 18/807; C08G 18/4083; C08G 18/6225; C08G 18/7831; C08G 18/7837; C08G 18/8175; B05D 1/005; B05D 1/3007; B05D 1/0272; B05D 1/144; B05D 7/546; C09K 9/02; C09K 2211/14; G03C 1/73; B05C 11/08; B05C 11/1036; B05C 11/1039; B05C 5/02; B05C 13/00
USPC ............ 359/238, 241, 244; 428/412, 423.3; 252/582, 586
See application file for complete search history.

PHOTOCHROMIC OPTICAL ARTICLE HAVING ALLOPHANATE PROTECTIVE COATING AND PROCESS FOR MAKING SAME

CROSS REFERENCE TO RELATED APPLICATIONS

The present application is entitled to and claims priority to U.S. Provisional Patent Application No. 61/890,045, filed Oct. 11, 2013, U.S. Provisional Patent Application No. 61/890,055, filed Oct. 11, 2013, and U.S. Provisional Patent Application No. 61/890,059, filed Oct. 11, 2013, the disclosures of which are each incorporated herein by reference in each case in their entirety.

FIELD

The present invention relates to a photochromic optical article, which includes: an optical substrate; a photochromic layer over a surface of the optical substrate, in which the photochromic layer includes a photochromic compound; and a protective layer over the photochromic layer, in which the protective layer includes a matrix that includes residues of an ethylenically unsaturated radically polymerizable material that includes at least one allophanate group.

BACKGROUND

Optical articles that provide good imaging qualities while reducing the transmission of incident light into the eye are needed for a variety of applications, such as sunglasses, vision correcting ophthalmic lenses, plano lenses and fashion lenses, e.g., non-prescription and prescription lenses, sport masks, face shields, goggles, visors camera lenses, windows, automotive windshields and aircraft and automotive transparencies, e.g., T-roofs, sidelights and backlights.

In response to certain wavelengths of electromagnetic radiation (or actinic radiation), photochromic materials undergo a transformation from one form or state to another form, with each form having a characteristic or distinguishable absorption spectrum associated therewith. Typically, upon exposure to actinic radiation, many photochromic materials are transformed from a closed-form, which corresponds to an unactivated (or bleached, e.g., substantially colorless) state of the photochromic material, to an open-form, which corresponds to an activated (or colored) state of the photochromic material. In the absence of exposure to actinic radiation, such photochromic materials are reversibly transformed from the activated (or colored) state, back to the unactivated (or bleached) state.

Photochromic plastic articles used for optical applications have been the subject of considerable attention. In particular, photochromic ophthalmic plastic lenses have been of interest because of the advantages associated with reduced weight that they can provide compared to glass lenses. Photochromic optical articles typically display colorless (e.g., clear) and colored states that correspond to the colorless and colored states of the photochromic materials contained therein. Photochromic compounds can be incorporated into optical articles, by methods including, imbibing a photochromic compound directly into an optical substrate, or by forming a photochromic coating layer over an optical substrate, which contains a photochromic compound.

Photochromic articles that include a photochromic coating layer further include, in some instances, a further layer, such as a protective layer, thereover. The protective layer can serve to protect the underlying photochromic layer from subsequently applied additional layers there-above. The protective layer is often formed from a protective layer coating composition. So as to form a continuous protective layer having a uniform thickness, the viscosity of the protective layer coating composition must typically be low. To reduce the viscosity of the protective layer coating composition to a desirable level, solvent is typically included in the protective layer coating composition. The amount of solvent present in the protective layer coating composition can have associated therewith concerns relating to increased economic costs and/or undesirable environmental impact.

SUMMARY

In accordance with the present invention, there is provided a photochromic optical article comprising: (i) an optical substrate; (ii) a photochromic layer over a surface of the optical substrate, wherein the photochromic layer comprises a photochromic compound; and (iii) a protective layer over the photochromic layer, wherein the protective layer comprises a matrix comprising residues of an ethylenically unsaturated radically polymerizable material comprising at least one allophanate group.

In accordance with the present invention there is further provided a method of preparing a photochromic optical article comprising: (a) applying a curable photochromic coating composition over a surface of an optical substrate, thereby forming a curable photochromic layer over the surface of the optical substrate, wherein the curable photochromic coating composition comprises a photochromic compound; (b) at least partially curing the curable photochromic layer, thereby forming an at least partially cured photochromic layer over the surface of the optical substrate; (c) applying a curable protective coating composition over the at least partially cured photochromic layer, thereby forming a curable protective layer over the at least partially cured photochromic layer, wherein the curable protective coating composition comprises an ethylenically unsaturated radically polymerizable material comprising at least one allophanate group; and (d) at least partially curing the curable protective layer, thereby forming an at least partially cured protective layer over the at least partially cured photochromic layer.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1 through 3, like characters refer to the same components, elements, and process steps, as the case may be, unless otherwise stated.

DETAILED DESCRIPTION

Figure 1:
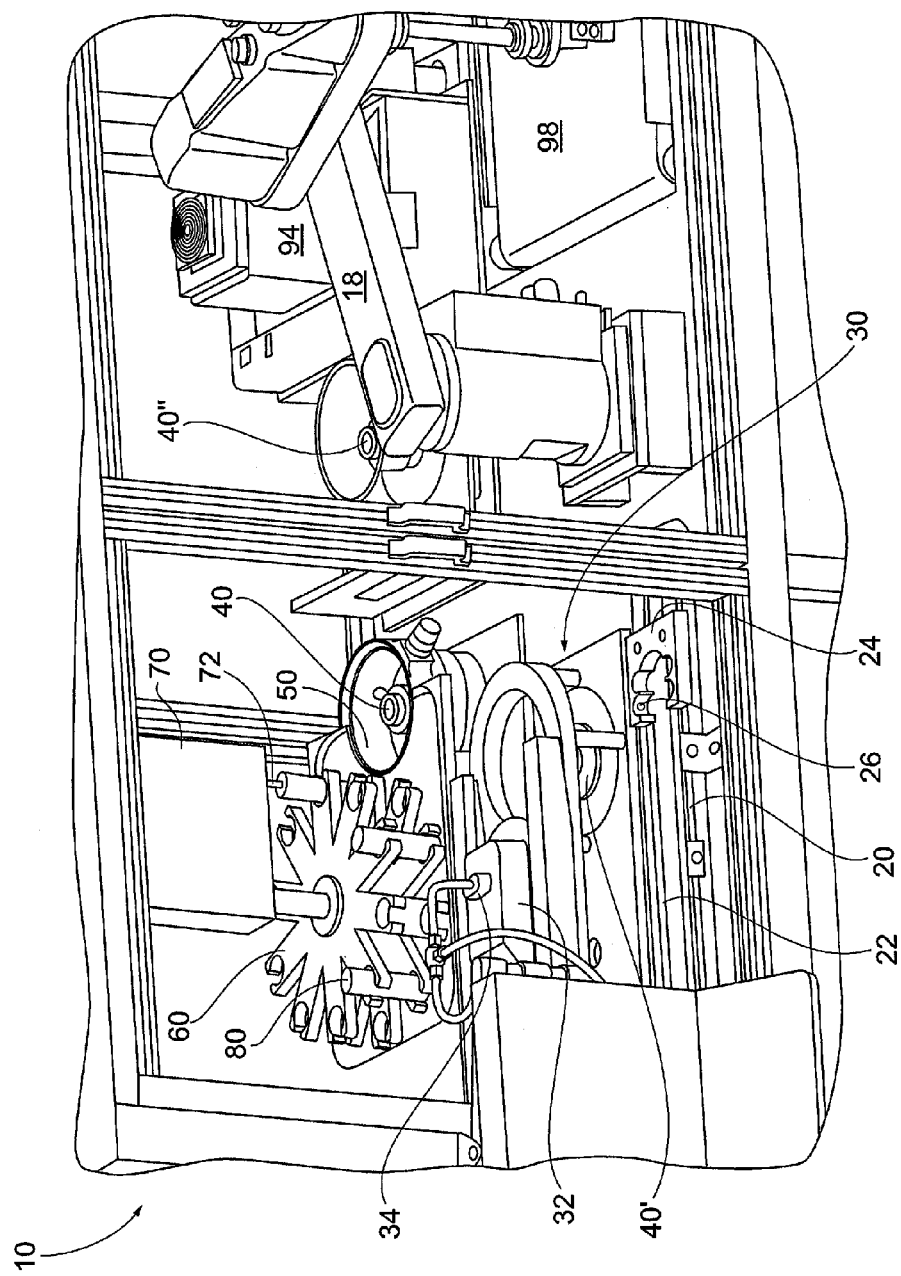
FIG. 1 is a representative perspective view of a spin coater that can be used in conjunction with some embodiments of the method of the present invention.

The terms "optical," "optically clear," and similar terms as used herein mean that the specified material (such as a substrate, film, coating, etc.) exhibits a light transmission value (transmits incident light) of at least 4 percent, and exhibits a haze value of less than 1 percent (such as, a haze value of less than 0.5 percent) when measured at 550 nanometers by, for example, a Haze Gard Plus Instrument.

As used herein, the term "photochromic" means having an absorption spectrum for at least visible radiation that varies in response to absorption of at least actinic radiation. Further, as used herein the term "photochromic material" means any substance that is adapted to display photochromic properties, i.e. adapted to have an absorption spectrum for at least visible radiation that varies in response to absorption of at least actinic radiation.

As used herein, the term "ophthalmic" means pertaining to or associated with the eye and vision. As used herein the term "ophthalmic substrate" means a substrate, such as a lens, that is ophthalmic. As used herein the terms "lens" and "lenses" means and encompasses at least, individual lenses, lens pairs, partially formed (or semi-finished) lenses, fully formed (or finished) lenses, and lens blanks. Examples of ophthalmic substrates, articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, protective lenses, protective visors, and protective shields.

As used herein, the term "transparent," such as used in connection with a substrate, film, material, and/or coating, means that the indicated substrate, (such as coating, film and/or material) has the property of transmitting light without appreciable scattering so that objects lying beyond are visibly observable.

As used herein, the term "coating" means a supported film derived from a flowable coating composition, which can optionally have a uniform thickness, and specifically excludes polymeric sheets. By contrast, as used herein the term "sheet" means a pre-formed film having a generally uniform thickness and which is capable of self-support. A sheet has two opposing surfaces, in which at least one surface thereof can have thereover one or more layers (including coating layers). As used herein, the terms "layer" and "film" each encompass both coatings (such as a coating layer or a coating film) and sheets, and a layer can include a combination of separate layers, including sub-layers and/or over-layers. In accordance with some embodiments, and as used herein, the term "coating" means, within appropriate context, the process of applying a coating composition (or material) to the substrate to form a coating (or coating layer).

As used herein, the term "substrate" means an article having at least one surface that is capable of accommodating a photochromic coating, e.g., a photochromic polymeric coating; namely, the substrate has a surface to which a photochromic coating can be applied. Non-limiting embodiments of the shape the surface of the substrate can have include, round, flat, cylindrical, spherical, planar, substantially planar, plano-concave and/or plano-convex, curved, including but not limited to, convex and/or concave, as exemplified by the various base curves used for ophthalmic lenses.

As used herein, the terms "cure," "cured," and related terms, means that at least a portion of the polymerizable and/or crosslinkable components that form a curable composition are at least partially polymerized and/or cross-linked. In accordance with some embodiments, the degree of crosslinking can range from 5% to 100% of complete crosslinking. In accordance with some further embodiments, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the term "actinic radiation" means electromagnetic radiation that is capable of causing a response in a material, such as, but not limited to, transforming a photochromic material from one form or state to another as discussed in further detail herein, or curing a material, such as a coating composition. Actinic radiation includes electromagnetic radiation having wavelengths ranging from the ultraviolet ("UV") light range, through the visible light range, and into the infrared (IR) range. Actinic radiation which can be used to cure coating compositions used in the present invention generally has wavelengths of electromagnetic radiation ranging from 150 to 2,000 nanometers (nm), can range from 180 to 1,000 nm, and also can range from 200 to 500 nm. Examples of suitable ultraviolet light sources include mercury arcs, carbon arcs, low, medium or high pressure mercury lamps, swirl-flow plasma arcs and ultraviolet light emitting diodes. With some embodiments ultraviolet light-emitting lamps include medium pressure mercury vapor lamps having outputs ranging from 200 to 600 watts per inch (79 to 237 watts per centimeter) across the length of the lamp tube. With some embodiments, a 1 mil (25 micrometers) thick wet film of a coating composition can be cured through its thickness to a tack-free state upon exposure to actinic radiation by passing the film under medium pressure mercury vapor lamps so as to provide an actinic radiation exposure at 200 to 1000 millijoules per square centimeter of the wet film.

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, physical properties, and so forth used in the specification and claims, are to be understood as modified in all instances by the term "about."

As used herein, the term "valve-less" means being free of a valve (not including a valve).

As used herein, the spin coater that can be used in conjunction with some embodiments of the method of the present invention is also referred to as a flexible spin coater for purposes including, but not limited to, indicating the flexibility the spin coater can provide with regard to applying a plurality of coating compositions in a sequence that can be selected from a plurality of coating application sequences.

As used herein, the term "IR" means infrared, such as infrared radiation.

As used herein, the term "UV" means ultraviolet, such as ultraviolet radiation.

As used herein, the term "(meth)acrylate" and related terms, such as "ester(s) of (meth)acrylic acid" means acrylates and/or methacrylates. As used herein, the term "(meth) acryloyl" means acryloyl and/or (meth)acryloyl.

As used herein, and unless otherwise noted, molecular weight values, such as Mn and Mw values, are determined using size exclusion chromatography, such as gel permeation chromatography, using suitable standards, such as polystyrene standards.

The various embodiments and examples of the present invention as presented herein are understood to be illustrative of the present invention and not restrictive thereof and are non-limiting with respect to the scope of the invention.

The photochromic optical article and method of the present invention include an optical substrate. Examples of optical substrates that can be used with various embodiments of the present invention include, but are not limited to, plano lenses, prescription lenses, which in each case can be finished lenses, unfinished lenses, or lens blanks. In accordance with some further embodiments, the lenses used with the various embodiments of the present invention, have a diameter of 50-85 mm with varied back curvatures (such as, from ½ base up to 10 base). For reference a finished lens is one in which the front and rear surface of the lens is formed (commonly by grinding and polishing) to the desired contour, while a semi-finished lens has only one (e.g., the top or front) finished surface. Both finished and unfinished lens often undergo further processing such as coating with photochromic material, hard coats, tinting layers, planarizing layers (generally categorized as coating layers providing optical, aesthetic or protective properties) as well as edging to fit the desired shape or other processing to couple to a frame or support structure.

The optical substrate of the various embodiments of the present invention can, with some embodiments, be formed from and correspondingly include organic materials, inorganic materials, or combinations thereof (for example, composite materials).

Examples of organic materials that can be used as optical substrates in accordance with various embodiments of the present invention, include polymeric materials, such as homopolymers and copolymers, prepared from the monomers and mixtures of monomers disclosed in U.S. Pat. No. 5,962,617 and in U.S. Pat. No. 5,658,501 from column 15, line 28 to column 16, line 17. For example, such polymeric materials can be thermoplastic or thermoset polymeric materials, can be transparent or optically clear, and can have any refractive index required. Examples of such monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

With some embodiments of the present invention, the optical substrate can be an ophthalmic substrate. Examples of organic materials suitable for use in forming ophthalmic substrates include art-recognized polymers that are useful as ophthalmic substrates, such as organic optical resins that are used to prepare optically clear castings for optical applications, such as ophthalmic lenses.

Examples of inorganic materials that can be used as optical substrates with some embodiments of the present invention include glasses, minerals, ceramics, and metals. With some embodiments, the optical substrate can include glass. In other embodiments, the optical substrate can have a reflective surface, for example, a polished ceramic substrate, metal substrate, or mineral substrate. In other embodiments, a reflective coating or layer (e.g., a metal layer, such as a silver layer) can be deposited or otherwise applied to a surface of an inorganic or an organic substrate to make it reflective or to enhance its reflectivity.

Optical substrates that can be used with the various embodiments of the present invention can also include untinted, tinted, linearly polarizing, circularly polarizing, elliptically polarizing, photochromic, or tinted-photochromic substrates. As used herein with reference to optical substrates, the term "untinted" means optical substrates that are essentially free of coloring agent additions (such as conventional dyes) and have an absorption spectrum for visible radiation that does not vary significantly in response to actinic radiation. Further, with reference to optical substrates the term "tinted" means substrates that have a coloring agent addition (such as conventional dyes) and an absorption spectrum for visible radiation that does not vary significantly in response to actinic radiation.

As used herein, the term "circularly polarizing" with reference to optical substrates refers to optical substrates that are adapted to circularly polarize electromagnetic radiation. As used herein, the term "elliptically polarizing" with reference to optical substrates refers to optical substrates that are adapted to elliptically polarize electromagnetic radiation. Further, as used herein, with reference to optical substrates, the term "tinted-photochromic" means optical substrates containing a coloring agent addition as well as a photochromic material, and having an absorption spectrum for visible radiation that varies in response to at least actinic radiation. Thus, for example, a tinted-photochromic substrate can have a first color characteristic of the coloring agent and a second color characteristic of the combination of the coloring agent and the photochromic material when exposed to actinic radiation.

The photochromic article of the present invention includes a photochromic layer over a surface of the optical substrate. The photochromic layer includes a photochromic compound. The photochromic layer can include a single layer or multiple layers, each having the same or a different composition, such as including the same or different photochromic compound(s). The photochromic layer is, with some embodiments, formed from a curable photochromic coating composition that includes a photochromic compound.

The photochromic layer and correspondingly the curable photochromic coating composition, includes at least one photochromic compound. Classes of photochromic compounds that can be included in the photochromic layer and curable photochromic coating composition include, but are not limited to, inorganic photochromic compounds, thermally reversible pyrans, non-thermally reversible pyrans, thermally reversible oxazines, non-thermally reversible oxazines, thermally reversible fulgides, and/or non-thermally reversible fulgides.

Examples of inorganic photochromic compounds that can be included in the curable photochromic coating composition and photochromic layer include, but are not limited to, crystallites of silver halide, cadmium halide, and/or copper halide. Further examples of inorganic photochromic materials include, but are not limited to, those prepared by the addition of europium(II) and/or cerium(II) to a mineral glass, such as a soda-silica glass. In accordance with some embodiments, the inorganic photochromic materials can be added to molten glass and formed into particles that are incorporated into the photochromic coating composition to form microparticles comprising such particulates. The glass particulates can be formed by any of a number of various art-recognized methods. Further examples of inorganic photochromic materials are further described in Kirk Othmer Encyclopedia of Chemical Technology, 4th ed., volume 6, pages 322-325.

Examples of thermally reversible photochromic pyrans from which photochromic compound(s) can be chosen and that can be used with various embodiments of the present invention, include, but are not limited to: benzopyrans; naphthopyrans, e.g., naphtho[1,2-b]pyrans, naphtho[2,1-b]pyrans; indeno-fused naphthopyrans, such as those disclosed in U.S. Pat. No. 5,645,767 at col. 2, line 16 to col. 12, line 57; heterocyclic-fused naphthopyrans, such as those disclosed in U.S. Pat. No. 5,723,072 at col. 2, line 27 to col. 15, line 55, U.S. Pat. No. 5,698,141 at col. 2, line 11 to col. 19, line 45, U.S. Pat. No. 6,153,126 at col. 2, line 26 to col. 8, line 60, and U.S. Pat. No. 6,022,497 at col. 2, line 21 to col. 11, line 46; spiro-9-fluoreno[1,2-b]pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. Additional examples of naphthopyrans and related organic photochromic substances are described, for example, in U.S. Pat. No. 5,658,501 at col. 1, line 64 to col. 13, line 17. The pertinent cited portions of the preceding U.S. patents are incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Examples of thermally reversible photochromic oxazines from which photochromic compound(s) can be chosen and that can be used with various embodiments of the present invention, include, but are not limited to, benzoxazines, naphthoxazines, and spiro-oxazines, e.g., spiro(indoline) naphthoxazines, spiro(indoline)pyridobenzoxazines, spiro (benzindoline) pyridobenzoxazines, spiro(benzindoline) naphthoxazines, spiro(indoline)benzoxazines, spiro (indoline)fluoranthenoxazine, and spiro(indoline) quinoxazine.

Examples of thermally reversible photochromic fulgides from which photochromic compound(s) can be chosen and that can be used with various embodiments of the present invention, include, but are not limited to: fulgimides, such as, 3-furyl and 3-thienyl fulgimides; fulgides, such as 3-furyl and 3-thienyl fulgides, which are disclosed in U.S. Pat. No. 4,931,220 at column 2, line 51 to column 10, line 7, and mixtures of any of the aforementioned photochromic materials/compounds. Examples of further non-thermally reversible photochromic compounds that can be used with various embodiments of the present invention, include, but are not limited to the photochromic compounds disclosed in US Patent Application Publication 2005/0004361 at paragraphs [0314] to [0317].

With some embodiments, the curable photochromic coating composition and photochromic layer includes a photochromic compound selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

The photochromic compound is present in the photochromic layer in an amount at least sufficient so as to provide the photochromic optical article with a desirable level of photochromic properties, which in some embodiments is referred to as a photochromic amount. With some embodiments, the amount of photochromic compound(s) present in the photochromic coating layer is from 0.01 percent by weight to 40 percent by weight, based on the total weight of photochromic coating layer. In accordance with some further embodiments, the amount of photochromic compound(s) present in the curable photochromic coating composition is from 0.01 percent by weight to 40 percent by weight, based on the solids weight of curable photochromic coating composition.

The photochromic layer is formed from a curable photochromic coating composition, with some embodiments of the present invention. With some embodiments, the curable photochromic coating composition includes: a curable resin component; a photochromic compound; optionally an organic solvent; and optionally one or more additives. In accordance with some embodiments of the present invention, the applied curable photochromic coating composition and correspondingly the curable photochromic layer can be cured by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions.

In accordance with some embodiments, the resulting (or at least partially cured) photochromic layer (resulting from at least partial cure of the curable photochromic layer) includes an organic matrix that includes: (i) a polymer chosen from poly(meth)acrylates, polyethers, polythioethers, polyesters, polyamides, polyurethanes, polythiourethanes, polyvinyls, polyolefins, and combinations thereof; and (ii) a plurality of crosslink linkages chosen from ether linkages, sulfide linkages, carboxylic acid ester linkages, carbonate linkages (e.g., —O—C(O)—O—), urethane linkages (e.g., —N(H)—C(O)—O—), thiourethane linkages (e.g., —N(H)—C(O)—S—), siloxane linkages, carbon-carbon linkages, and combinations thereof. With some embodiments, carbon-carbon linkages are formed in the organic matrix of the at least partially cured photochromic layer by free radical reactions or free radical polymerization, such as in the case of actinic radiation curable coating compositions.

With some embodiments of the present invention, the photochromic layer includes a matrix that includes urethane linkages (e.g., —N(H)—C(O)—O—). Correspondingly and in accordance with some further embodiments of the present invention, the curable photochromic coating composition includes materials (or reactants) that result in the formation of a matrix that includes urethane linkages. Urethane linkages result from, with some embodiments, the reaction of a hydroxyl group (—OH) with an isocyanate group (—NCO). The hydroxyl groups can be present on one or more polymers, including those described previously herein, such as a (meth)acrylate polymer, with some embodiments. The isocyanate groups can be present on a polyisocyanate cross-linker, including those as described further herein, with some embodiments.

In accordance with some further embodiments, the curable photochromic coating composition includes: a (meth)acrylate copolymer having active hydrogen functionality selected from hydroxyl, thiol, primary amine, secondary amine, and combinations thereof; optionally a polyol that is different than the (meth)acrylate copolymer; a polyisocyanate, such as a diisocyanate and/or a triisocyanate, each optionally blocked with a suitable blocking or leaving group, such as, 3,5-dimethyl pyrazole; one or more organic solvents, as described further herein; and optionally one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer of the curable photochromic coating composition can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Examples of polyols that can be present in the curable photochromic coating composition include, but are not limited to glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, and 4,4'-methylenediphenol. With some further embodiments, the polyols that can be present in the curable photochromic coating composition include, but are not limited to, polyols having number average molecular weights of from 500 to 3500, or from 650 to 2500, or from 650 to 1500, or from 850 to 1200, or from 850 to 1000, such as, but not limited to, polyether polyols and/or polycarbonate polyols. Additional polyols that can be used in the curable photochromic coating composition from which the photochromic coating layer is prepared include, but are not limited to, art-recognized materials, such as polyether polyols and polycarbonate polyols, described in U.S. Pat. No. 7,465,414 at column 15, line 22 through column 16, line 62, which disclosure is incorporated herein by reference.

In accordance with some further embodiments, the polyols that can be present in the curable photochromic coating composition include, but are not limited to, one or more high molecular weight polycarbonate polyols, that have carbonate groups within the backbone thereof. With some embodiments, such high molecular weight polycarbonate polyols are high molecular weight polycarbonate diols. With some additional embodiments, the high molecular weight polycarbonate polyols further include one or more linkages in the backbone that are selected from ester linkages, ether linkages, amide linkages, and/or urethane linkages. The high molecular weight polycarbonate polyols, with some embodiments, have Mn values of at least 5000 g/mole, or at least 6000 g/mole, or at least 8000 g/mole. The high molecular weight polycarbonate polyols, with some embodiments, have Mn values of less than or equal to 20,000 g/mole, or less than or equal to 15,000 g/mole, or less than or equal to 10,000 g/mole. In accordance with some further embodiments, the high molecular weight polycarbonate polyols have Mn values ranging between any combination of the above recited upper and lower v, such as from 5000 to 20,000 g/mole, or from 6000 to 15,000 g/mole, or from 8000 to 10,000 g/mole. The polycarbonate polyols, with some embodiments, have PDI values of less than or equal to 2.0, or less than or equal to 1.5, or less than or equal to 1.3.

The high molecular weight polycarbonate polyols are, with some embodiments, prepared by art-recognized isolation methods that involve isolating a high molecular weight fraction of polycarbonate polyols from a feed polycarbonate polyol that is composed of a mixture of low and high molecular weight polycarbonate polyols. With some embodiments, the high molecular weight polycarbonate polyols are obtained by successively washing a feed polycarbonate polyol with a suitable solvent, such as methanol, with removal of a low molecular weight fraction between each successive washing, until a product polycarbonate polyol is obtained that has a desirably high (or increased) molecular weight, such as an Mn value of at least 5000 g/mole, and a desirably low (or reduced) PDI value, such as less than or equal to 1.5. With some embodiments, the high molecular weight polycarbonate polyols are isolated from feed aliphatic polycarbonate polyols. Examples of commercially available feed aliphatic polycarbonate polyols, from which the high molecular weight polycarbonate polyols are isolated, with some embodiments, include but are not limited to: PC-1122 polycarbonate polyol, which is commercially available from Stahl USA; ETERACOLL™ PH-200D, PH-200 and UH-200 polycarbonate polyols, which are commercially available from Ube Chemical; DURANOL™ T5652 polycarbonate polyol, which is commercially available from Asahi-KASEI; and/or RAVE-CARB™ 107 polycarbonate polyol, which is commercially available from Enichem.

High molecular weight polycarbonate polyols that can be present in the curable photochromic coating composition include, but are not limited to, those described in further detail in paragraphs [0041]-[0047] and [0102]-[0114] of United States Patent Application Publication No. US 2012/0212840 A1, the cited disclosure of which is incorporated herein by reference.

Polyfunctional isocyanates (or polyisocyanates) that can be present in the curable photochromic coating composition from which the photochromic layer is prepared (or formed) include, but are not limited to, aliphatic, aromatic, cycloaliphatic and heterocyclic polyisocyanates, and mixtures of such polyisocyanates. Examples of polyisocyanates that can be present in the curable photochromic coating composition include, but are not limited to: toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; dimers and trimers of such diisocyanates containing isocyanurate, uretidino, biruet, or allophanate linkages (such as a trimer of isophorone diisocyanate); and mixtures and/or combinations of two or more thereof. Further examples of polyisocyanates that can be present in the curable photochromic coating composition include, but are not limited to those described in U.S. Pat. No. 7,465,414 at column 16, line 63 through column 17, line 38, which disclosure is incorporated herein by reference.

Catalysts that catalyze the formation of urethane linkages that can be used in the curable photochromic coating composition from which the photochromic layer is prepared (or formed) include, but are not limited to, art-recognized materials, such as one or more stannous salts of an organic acid, examples of which include, but are not limited to, stannous octoate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Additional classes of catalysts include, but are not limited to, bismuth salts of organic acids, such as bismuth 2-ethylhexanoate, and zinc-based catalysts. The catalyst is present in the curable photochromic coating composition, with some embodiments, in an amount that is at least sufficient to catalyze the formation of urethane linkages under the particular cure conditions that are employed. With some embodiments, the catalyst is a stannous salt of an organic acid, which is present in an amount of from 0.0005-0.02 parts per 100 parts of the polyurethane-forming components. Further non-limiting examples of components, such as polyols, polyisocyanates, and catalysts, that can, with some embodiments, be used with curable polyurethane coating compositions from which the curable photochromic coating compositions of the method of the present invention can be selected, are described in U.S. Pat. No. 4,889,413 and U.S. Pat. No. 6,187,444 B1.

The curable photochromic coating composition can further include at least one additive that, with some embodiments, is capable of facilitating one or more of the processing, the properties, or the performance of the curable photochromic coating composition and resulting photochromic layer. Non-limiting examples of such additives include static dyes, photoinitiators, thermal initiators, polymerization inhibitors, light stabilizers (such as, but not limited to, ultraviolet light absorbers and light stabilizers, such as hindered amine light stabilizers (HALS)), heat stabilizers (such as, but not limited to, hindered phenols), mold release agents, rheology control agents, leveling agents (such as, but not limited to, surfactants), free radical scavengers, and adhesion promoters (such as hexanediol diacrylate and coupling agents).

Examples of static dyes (i.e., tints or dyes that are not photochromic) that can be present in the curable photochromic coating composition and the resulting photochromic layer include, but are not limited to, art-recognized static organic dyes that are capable of imparting a desired color or other optical property to the photochromic coating layer. Examples of static dyes that can be present in the curable photochromic coating composition and photochromic layer include, but are not limited to, azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures and/or combinations thereof. Examples of anthraquinone dyes from which the fixed dye can be selected, with some embodiments, include but are not limited to, 1,4-dihydroxy-9,10-antracenedione (CAS registry No. 81-64-1), 1,4-bis(4-methylphenyl)amino-9,10-anthracendione (CAS registry No. 128-80-3), 1,4-bis((2-bromo-4,6-dimethylphenyl)amino)-9,10-anthracenedione (CAS registry No. 18038-98-8), and mixtures thereof.

The curable photochromic coating composition can include one or more solvents, with some embodiments. Examples of solvents include, but are not limited to, the following: propylene glycol monomethyl ether acetate and their derivates (sold as DOWANOL solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propiOnate, propylene carbonate, tetrahydrofuran, toluene, xylene, 2-methoxyethyl ether, 3-propylene glycol methyl ether, and mixtures thereof. The solvent can be present in the curable photochromic coating composition, with some embodiments, in an amount of from 1 percent by weight to 95 percent by weight, or from 10 percent by weight to 75 percent by weight, or from 25 percent by weight to 60 percent by weight, in each case based on total weight of the curable photochromic coating composition.

The curable photochromic coating composition can be applied over the optical substrate in accordance with one or more art-recognized application methods. With some embodiments, the curable photochromic coating composition is applied over the optical substrate by an application method selected from spray methods, curtain coating methods, dip (or immersion) coating methods, spin coating methods, doctor (or draw-down) blade application methods, and combinations of two or more such application methods.

The photochromic layer, which can be an at least partially cured photochromic layer, can have any suitable thickness, provided it provides the photochromic article with a desirable level of photochromic properties. With some embodiments, the photochromic layer has a thickness of from 0.5 microns to 20 microns, such as from 1 to 10 microns, or from 2 to 8 microns, or from 3 to 5 microns, inclusive of the recited values.

The photochromic optical articles of the present invention further include, a protective layer over the photochromic layer. The protective layer can include a single layer or multiple layers, each having the same or a different composition. The protective layer includes a matrix that includes residues of an ethylenically unsaturated radically polymerizable material that includes at least one allophanate group. The protective layer is, with some embodiments, formed from a curable protective coating composition that includes an ethylenically unsaturated radically polymerizable material that includes at least one allophanate group.

The ethylenically unsaturated radically polymerizable material that includes at least one allophanate group can be selected from art-recognized monomeric, oligomeric, and/or polymeric materials, such as urethanes, each having at least one, or at least two, or at least three ethylenically unsaturated radically polymerizable groups. The ethylenically unsaturated radically polymerizable material that includes at least one allophanate group can be prepared in accordance with art-recognized methods.

With some embodiments, the ethylenically unsaturated radically polymerizable material that includes at least one allophanate group is prepared from, for example: (i) aliphatic and/or aromatic polyfunctional isocyanates, such as diisocyanates; and (ii) an aliphatic and/or aromatic hydroxyl functional material selected from mono-functional aliphatic and/or aromatic alcohols and/or polyfunctional alcohols, such as difunctional aliphatic and/or aromatic alcohols. With some embodiments, the ethylenically unsaturated radically polymerizable material that includes at least one allophanate group, includes a residue of a reaction product of two moles of hexamethylene diisocyanate and an aliphatic and/or aromatic mono-functional alcohol. The mono-functional alcohol of the residue can include at least one ethylenically unsaturated radically polymerizable group. In addition or alternatively, the isocyanate groups of the residue can be reacted with a hydroxyl functional material having at least one ethylenically unsaturated radically polymerizable group.

With some further embodiments, the ethylenically unsaturated radically polymerizable material that includes at least one allophanate group, is prepared in accordance with art-recognized methods from one or more compounds containing uretdione groups and one or more hydroxyl functional compounds containing ethylenically unsaturated radically polymerizable groups, such as described in U.S. Pat. Nos. 7,902,315, 7,960,446 B2 and 8,604,097 B2, the disclosures of which are incorporated herein by reference in their entireties.

In accordance with some further embodiments, the ethylenically unsaturated radically polymerizable material that includes at least one allophanate group, is prepared in accordance with art-recognized methods from an adduct of one or more polyisocyanates, such as one or more diisocyanates, such as described in U.S. Pat. No. 7,294,656, the disclosure of which is incorporated herein by reference in its entirety.

The content of allophanate groups in the ethylenically unsaturated radically polymerizable material that includes at least one allophanate group is not limited. With some embodiments, the content of allophanate groups (calculated as $C_2N_2HO_3$=101 g/mole) in the ethylenically unsaturated radically polymerizable material that includes at least one allophanate group, is at least 1 percent by weight, or at least 2 percent by weight, and less than or equal to 50 percent by weight, or less than or equal to 40 percent by weight, or less than or equal to 35 percent by weight, or less than or equal to 30 percent by weight, or less than or equal to 25 percent by weight, in each case based on the total weight of the ethylenically unsaturated radically polymerizable material that includes at least one allophanate group. The content of allophanate groups in the ethylenically unsaturated radically polymerizable material that includes at least one allophanate group, can range between any combination of these upper and lower values, inclusive of the recited values.

The ethylenically unsaturated radically polymerizable group(s) of the material that includes at least one allophanate group, can be selected from one or more art-recognized groups that are radically polymerizable with exposure to elevated temperatures and/or actinic radiation (such as UV radiation). With some embodiments, the ethylenically unsaturated radically polymerizable group(s) of the material that includes at least one allophanate group, are selected from (meth)acrylate groups, vinyl groups, vinyl-aromatic groups, olefinic groups, and/or allyl groups. With some embodiments the ethylenically unsaturated radically polymerizable group(s) of the material that includes at least one allophanate group, are selected from (meth)acrylate groups and/or allyl groups.

As used herein, by "allyl" and related terms, such as "allylic," means substituted and/or unsubstituted allylic groups, such as represented by the following Formula (A),

$$H_2C=C(|R^d|)-C|H_2- \tag{A}$$

With reference to Formula (A), $R^d$ is hydrogen, halogen or a $C_1$ to $C_4$ alkyl group. With some embodiments, $R^d$ is hydrogen or methyl and consequently Formula (A) represents an unsubstituted (meth)allyl radical.

The ethylenically unsaturated radically polymerizable material that includes at least one allophanate group can have any suitable molecular weight. With some embodiments, the ethylenically unsaturated radically polymerizable material that includes at least one allophanate group has a molecular weight, such as Mn, at least 500 g/mole, or at least 1000 g/mole, and less than or equal to 20,000 g/mole, or less than or equal to 15,000 g/mole, or less than or equal to 10,000 g/mole, or less than or equal to 8,000 g/mole, or less than or equal to 7,000 g/mole. The molecular weight of the ethylenically unsaturated radically polymerizable material that includes at least one allophanate group can range between any combination of these upper and lower Mn values, inclusive of the recited Mn values.

The matrix of the protective layer can, with some embodiments, further include residues of a second ethylenically unsaturated radically polymerizable material that is free of allophanate groups. The curable protective coating composition, correspondingly, can further include, with some embodiments, a second ethylenically unsaturated radically polymerizable material that is free of allophanate groups. The second ethylenically unsaturated radically polymerizable material can include ethylenically unsaturated radically polymerizable group(s) selected from (meth)acrylate groups, vinyl groups, vinyl-aromatic groups, olefinic groups, and/or allyl groups, with some embodiments.

Examples of second ethylenically unsaturated radically polymerizable materials that are free of allophanate groups, and which can be included in the curable protective coating composition, include, but are not limited to: $C_1$-$C_{20}$ linear, branched, or cyclic alkyl (meth)acrylate monomers; allylic monomers; bis(allyl carbonate) monomers, such as polyol (allyl carbonate) monomers, such as polyalkylene glycol bis(allyl carbonate) monomers, dithylene glycol bis(allyl carbonate) monomer, bisphenol A bis(allyl carbonate) monomer, and alkoxylated bisphenol A bis(allyl carbonate) monomers; polyfunctional (meth)acrylate monomers, such as alkylene glycol bis(meth)acrylate monomers, polyalkylene glycol bis(meth)acrylate monomers, trimethylolpropane tris(meth)acrylate monomer, alkoxylated trimethylolpropane tris(meth)acrylate monomers, polyalkoxylated trimethylolpropane tris(meth)acrylate monomers, pentaerythritol tris(meth)acrylate, pentaerythritol tetrakis(meth) acrylate, alkoxylated pentaerythritol tris(meth)acrylate, alkoxylated pentaerythritol tetrakis(meth)acrylate, polyalkoxylated pentaerythritol tris(meth)acrylate, polyalkoxylated pentaerythritol tetrakis(meth)acrylate, dipentaerythritol hexakis(meth)acrylate, alkoxylated, dipentaerythritol hexakis(meth)acrylate, and polyalkoxylated dipentaerythritol hexakis(meth)acrylate; vinyl aromatic monomers, such as styrene, alpha-methylstyrene, p-chloromethylstyrene, divinyl benzene, vinyl naphthalene and divinyl naphthalene; vinyl esters of carboxylic acids such as, vinyl acetate, vinyl butyrate, vinyl 3,4-dimethoxybenzoate, and vinyl benzoate; olefin monomers, such as propylene, 1-butene, 1,3-butadiene, isobutylene and diisobutylene; and other ethylenically unsaturated radically polymerizable monomers, such as cyclic anhydrides (such as maleic anhydride, 1-cyclopentene-1,2-dicarboxylic anhydride and itaconic anhydride), esters of acids that are unsaturated but do not have alpha, beta-ethylenic unsaturation, (such as methyl ester of undecylenic acid), and diesters of ethylenically unsaturated dibasic acids (such as diethyl maleate).

Examples of allylic monomers from which the second ethylenically unsaturated radically polymerizable material that is free of allophanate groups can be selected, include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.

Examples of $C_1$-$C_{20}$ linear, branched, or cyclic alkyl (meth)acrylate monomers from which the second ethylenically unsaturated radically polymerizable material that is free of allophanate groups can be selected, include, but are not limited to, methyl (meth)acrylate, ethyl (meth)acrylate, propyl (meth)acrylate, isopropyl (meth)acrylate, butyl (meth)acrylate, isobutyl (meth)acrylate, tert-butyl (meth) acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate.

The curable protective coating composition can further include, with some embodiments, an initiator that is capable of initiating free radical polymerization of and amongst the ethylenically unsaturated groups of the components thereof. The initiator can be a thermal initiator and/or an actinic radiation activated initiator. With some embodiments, the curable protective coating composition includes a free radical initiator that is thermally activated. By "thermally activated" means the free radical initiator becomes active at elevated temperature, such as at temperatures greater than ambient room temperature, such as greater than 25° C.

The thermally activated free radical initiator of the curable protective coating composition can, with some embodiments, be selected from organic peroxy compounds, azobis (organonitrile) compounds, N-acyloxyamine compounds, O-imino-isourea compounds, and combinations of two or more thereof.

Examples of organic peroxy compounds, that can be used as thermal polymerization initiators include, but are not limited to: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauryl peroxide, propionyl peroxide, acetyl peroxide, benzoyl peroxide, p-chlorobenzoyl peroxide; peroxyesters such as t-butylperoxy pivalate, t-butylperoxy octylate, and t-butyl peroxyisobutyrate; methylethylketone peroxide, and acetylcyclohexane sulfonyl peroxide. With some embodiments, further examples of peroxy compounds from which the free radical initiator can be selected include, but are not limited to, 2,5-dimethyl-2,5-di(2-ethylhexylperoxy)hexane, and/or 1,1-bis(tert-butylperoxy)-3,3,5-trimethylcyclohexane.

Examples of azobis(organonitrile) compounds, that can be used as thermal polymerization initiators in the curable protective coating composition, include, but are not limited to, azobis(isobutyronitrile), 2,2'-azobis(2-methyl-butanenitrile), and/or azobis(2,4-dimethylvaleronitrile).

With some further embodiments, the thermally activated free radical initiator is selected from 1-acetoxy-2,2,6,6-tetramethylpiperidine, and/or 1,3-dicyclohexyl-O—(N-cyclohexylideneamino)-isourea.

With some embodiments, the curable protective coating composition includes a free radical initiator that is activated by exposure to actinic radiation, such as UV radiation and/or visible light. Such actinic radiation activatable free radical initiators are generally referred to as photoinitiators, with some embodiments.

Non-limiting examples of photoinitiators that can be present in the curable protective coating composition, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in the curable protective coating composition, is a visible light photoinitiator. Examples of suitable visible light photoinitiators include but are not limited to, benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, alpha-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, 2,6-dichlorobenzoyldiphenylphosphine oxide, and 2,6-dimethoxybenzoyldiphenylphosphine oxide, bisacylphosphine oxides, e.g., bis (2,6-dimethyoxybenzoyl)-2,4,4-trimethylepentylphosphine oxide, bis(2,6-dimethylbenzoyl)-2,4,4-trimethylpentylphosphine oxide, bis (2,4,6-trimethylbenzoyl)-2,4,4-trimethylpentylphosphine oxide, and bis(2,6-dichlorobenzoyl)-2,4,4-trimethylpentylphosphine oxide, phenyl-4-octyloxyphenyliodonium hexafluoroantimonate, dodecyldiphenyliodonium hexafluoroantimonate, (4-(2-tetradecanol)oxyphenyl)iodonium hexafluoroantimonate and mixtures thereof. Further examples of photoinitiators are set forth at column 12, line 11 to column 13, line 21 of U.S. Pat. No. 6,602,603, which is specifically incorporated by reference herein.

The curable protective coating composition can, with some embodiments, further include one or more additives, which can be selected from one or more of those classes and examples as described previously herein with regard to the curable photochromic coating composition. With some embodiments, the curable protective coating composition includes a polymerization inhibitor. Examples of polymerization inhibitors include, but are not limited to: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

With some embodiments, the matrix of the protective layer further includes residues of an aminoplast material. Correspondingly, and with some embodiments, the curable protective coating composition further includes an aminoplast material (or resin). Aminoplast resins are typically condensation products of amines or amides with aldehydes. Examples of amines or amides that can be used to prepare aminoplast resins include, but are not limited to, melamine, benzoguanamine, glycoluril, urea, and similar compounds. With some embodiments, the aminoplast resin has at least two reactive groups.

Generally, the aldehyde from which the aminoplast material is prepared, is formaldehyde, although products can be made from other aldehydes such as acetaldehyde, crotonaldehyde, benzaldehyde and furfural. The condensation products typically contain methylol groups or similar alkylol groups depending on the particular aldehyde employed. These alkylol groups can be etherified by reaction with an alcohol. Examples of alcohols that can be used for etherification include, but are not limited to, monohydric alcohols containing from 1 to 6 carbon atoms such as methanol, ethanol, isopropanol, n-butanol, pentanol and hexanol. With some embodiments, alcohols containing from 1 to 4 carbon atoms are used for etherification.

Aminoplast materials (or resins) that can be used with the various embodiments of the present invention include those which are commercially available from American Cyanamid Co. under the trademark CYMEL and/or from Monsanto Chemical Co. under the trademark RESIMENE. With some embodiments, the aminoplast resin used with the embodiments of the present invention is an alkylated melamine-formaldehyde condensate found in products such as CYMEL 345, 350, and/or 370 resins, and/or RESIMENE 718 resins. With some further embodiments, condensation products of other amines and amides can also be used with the various embodiments of the present invention, such as, for example, aldehyde condensates of triazines, diazines, triazoles, guanidines, guanimines and alkyl- and aryl-substituted derivatives of such compounds, including alkyl- and aryl-substituted melamines. Some examples of such compounds include, but are not limited to, N,N'-dimethyl urea, benzourea, dicyandiamide, formaguanamine, acetoguanamine, ammeline, 2-chloro-4,6-diamino-1,3,5-triazine, 6-methyl-2,4-diamino,1,3,5-traizine, 3,5-diaminotriazole, triaminopyrimidine,2-mercapto-4,6-diamino-pyrimidine, 3,4,6-tris(ethylamino)-1,3,5-triazine, tris(alkoxycarbonylamino)triazine, and the like.

With some embodiments, the aminoplast material is present in the curable protective coating composition in an amount of at least 1 percent by weight, or at least 5 percent by weight, and less than or equal to 40 percent by weight, or less than or equal to 30 percent by weight, or less than or equal to 25 percent by weight, or less than or equal to 20 percent by weight, based on the solids weight of the curable protective coating composition.

With some embodiments, the curable protective coating composition includes an aminoplast material, and the curable protective coating composition is curable by exposure to actinic radiation and optionally thermal energy (such as, elevated temperature). The additional and optional thermal cure step can be conducted before, concurrent with, and/or after the actinic radiation cure step. With some embodiments, the additional and optional thermal cure step can be conducted after completion of the actinic radiation cure step.

In accordance with some embodiments, the curable protective coating composition includes an aminoplast material, and is free of materials having functional groups that are reactive with the aminoplast material, such as hydroxyl groups.

The matrix of the protective layer, and correspondingly the curable protective coating composition, are each free of a photochromic compound, with some embodiments of the present invention.

The curable protective coating composition can, with some embodiments, include one or more solvents, which can be selected from those classes and examples of solvents as described previously herein with regard to the curable photochromic coating composition. The optional solvent can, with some embodiments, be present in the curable protective coating composition in any suitable amount, such as, but not limited to, those amounts and ranges as described previously herein with regard to the curable photochromic coating composition.

With some embodiments, the curable protective coating composition has a solids content of 95 percent by weight to 100 percent by weight, based on the total weight of the curable protective coating composition. The term "solids content" as used herein with regard to the curable protective coating composition means those components of the curable protective coating composition which are not volatile, such as which remain in the resulting cured protective coating layer, and which does not include solvent. With some embodiments, the curable protective coating composition has a solvent content of from 0 percent by weight to 5 percent by weight, based on the total weight of the curable protective coating composition.

The protective layer can have any suitable thickness. With some embodiments, the protective layer has a thickness of from 0.5 micron to 20 microns, such as from 1 to 10 microns, or from 2 to 8 microns, or from 3 to 5 microns, inclusive of the recited values.

Figure 3:
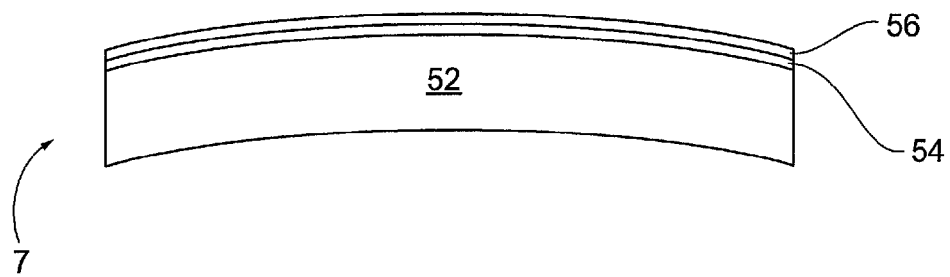
FIG. 3 is a representative schematic section view of a photochromic optical article prepared in accordance with the method of the present invention.

For purposes of non-limiting illustration and with reference to FIG. 3 of the drawings, there is depicted a representative photochromic optical article 7 according to the present invention, which includes a photochromic layer 54 over and in abutting relationship with an optical substrate 52. Photochromic optical article 7 further includes a protective layer 56, which is over and in abutting relationship with photochromic layer 54. One or more optional further layers (not shown) can be: (i) interposed between optical substrate 52 and photochromic layer 54; and/or (ii) interposed between photochromic layer 54 and protective layer 56; and/or (iii) over protective layer 56.

The photochromic optical article, with some embodiments, is a photochromic ophthalmic article. Non-limiting examples of ophthalmic articles or elements include, but are not limited to those described previously herein, such as, corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

In accordance with some embodiments, the photochromic optical article further includes a hard-coat layer over the protective layer. The hard-coat layer is formed, with some embodiments, by applying a curable hard-coat coating composition over the at least partially cured protective layer.

Each hard-coat layer can include a single layer or multiple layers, each having the same or a different composition. The optional hard-coat layer, formed from an optional curable hard-coat coating composition, can be selected from abrasion-resistant coatings including organo silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. With some embodiments, the optional hard-coat layer is a hard-coat layer that includes a first coating of a radiation-cured acrylate-based thin film and a second coating including an organo-silane. Non-limiting examples of commercially available hard coating products include SILVUE® 124 coatings, commercially available from SDC Coatings, Inc., and HI-GARD® coatings, commercially available from PPG Industries, Inc.

The optional hard-coat layer can be selected from art-recognized hard-coat materials, such as organo-silane abrasion-resistant coatings. Organo-silane abrasion-resistant coatings, often referred to as hard-coats or silicone-based hard-coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard-coatings, which disclosures are also incorporated herein by reference. The hard-coat layer can be applied by those coating methods as described previously herein with regard to the photochromic coating layer, such as spin coating.

Other curable hard-coat compositions that can be used to form the optional hard-coat layer, include, but are not limited to, curable polyfunctional acrylic hard-coat compositions, curable melamine-based hard-coat compositions, curable urethane-based hard-coat compositions, curable alkyd-based hard-coat compositions, curable silica sol-based hard-coat compositions, and other organic or inorganic/organic hybrid hard-coat compositions.

The optional curable hard-coat composition, with some embodiments, is selected from art-recognized curable organo-silane type hard-coat compositions. Organo-silane type hard-coat compositions from which the optional curable hard-coat composition can be selected include, but are not limited to, those disclosed at column 24, line 46 through column 28, line 11 of U.S. Pat. No. 7,465,414 B2, which disclosure is incorporated herein by reference.

Further examples of coating compositions from which the optional curable hard-coat composition can be selected, include but are not limited to: curable (meth)acrylate based hard-coat compositions, such as described in U.S. Pat. No. 7,410,691; radiation curable acrylate based hard-coat compositions, such as described in U.S. Pat. No. 7,452,611 B2; thermally cured hard-coat compositions, such as described in U.S. Pat. No. 7,261,843; maleimide based hard-coat compositions, such as described in U.S. Pat. No. 7,811,480; and dendritic polyester (meth)acrylate based hard-coat compositions, such as described in U.S. Pat. No. 7,189,456.

The curable hard-coat coating composition can optionally include one or more additives, such as described herein with regard to the curable photochromic coating composition. The curable hard-coat coating composition can be applied by one or more art-recognized application methods, including those described previously with regard to the curable photochromic coating composition.

The curable hard-coat composition is, with some embodiments, curable by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions.

The optional hard-coat layer can have any suitable thickness. With some embodiments, the optional hard-coat layer has a thickness of from 0.5 microns to 20 microns, such as from 1 to 10 microns, or from 2 to 8 microns, or from 3 to 5 microns, inclusive of the recited values.

The photochromic optical article of the present invention, with some embodiments, can further optionally include a polarizing layer that is: (i) interposed between the surface of said optical substrate and the photochromic layer; and/or (ii) over the photochromic layer.

Each optional polarizing layer can, with some embodiments, be independently selected from art-recognized polarizing layers. With some embodiments, each optional polarizing layer is a conventional linearly polarizing layer formed from one or more layers of unilaterally stretched polymer films, such as unilaterally stretched polyvinyl alcohol films, optionally containing a dichroic material.

In accordance with the present invention, there is further provided a method of forming a photochromic optical article, as described previously herein. The curable photochromic coating composition, the curable protective coating composition, the optional curable hard-coat coating composition, and the optional polarizing layer as used with the various embodiments of the method of the present invention are each as described previously herein, with some embodiments.

The curable photochromic coating composition, the curable protective coating composition, and the optional curable hard-coat coating composition can each be applied with the method of the present invention in accordance with one or more art-recognized application methods, including, but not limited to, those described previously herein with reference to the curable photochromic coating composition.

In accordance with some embodiments, each coating composition is independently applied with the method of the present invention by a spin coating application process. In accordance with some further embodiments, each coating composition is independently applied with the method of the present invention by a spin coating application process using a spin coater, such as, but not limited to, spin coater 10 depicted in FIGS. 1 and 2 of the drawings.

Figure 2:
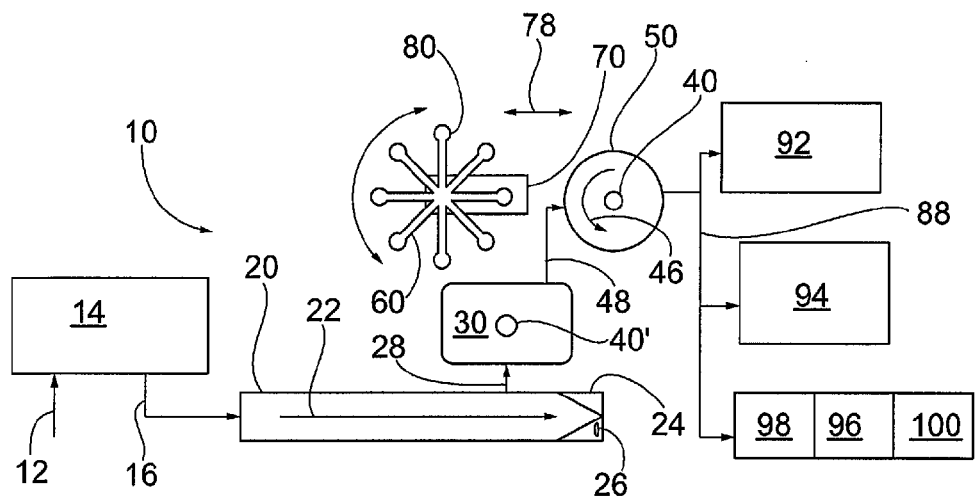
FIG. 2 is a representative schematic plan view of a modified embodiment of the spin coater of FIG. 1.

With non-limiting reference to the drawings, FIG. 1 is a representative perspective view of a flexible spin coater 10 that includes, or has associated therewith, integrated curing stations, for selectively applying multiple coatings to an optical substrate in accordance with some embodiments of the present invention. With reference to FIG. 2, there is depicted a representative schematic plan view of a modified embodiment of the spin coater 10 of FIG. 1.

The flexible spin coater 10 as described herein, and in accordance with some embodiments, provides a low cost, small scale (such as, producing up to 100 coated optical substrates per hour) top side spin coating machine that can include a surface pretreatment station (such as, but not limited to, plasma pretreatment station) that cleans, coats (utilizing one or more of multiple coatings and combinations of coatings), and which utilizes one or more of several different curing methods (such as, UV, IR, and/or thermal curing apparatae) or combinations thereof. The spin coater used with the method of the present invention can, with some embodiments, be operated with the formation of minimal waste streams and/or waste materials.

The spin coater used in accordance with some embodiments of the method of the present invention can have any suitable dimensions, which can, with some embodiments, be appropriately scaled to the space, such as a room, in which the spin coater is placed for operation. With some embodiments, the spin coater, including an enclosure, a control panel, and a filter (such as a high-efficiency particulate air or HEPA filter) has a width of from 0.76 meters (m) to 1.52 m (2.5 to 5 feet), or from 0.91 m to 1.37 m (3 to 4.5 feet); a length of from 0.91 m to 3.66 m (3 to 12 feet), or from 0.91 m to 3.05 m (3 to 10 feet), or from 1.22 m to 2.13 m (4 to 7 feet); and a height of from 1.83 m to 3.05 m (6 to 10 feet), or from 2.13 m to 2.74 m (7 to 9 feet).

The spin coater 10 can, with some embodiments, be used to coat a variety of substrates, such as, but not limited to, optical substrates. Examples of optical substrates that can be coated with the spin coater in accordance with various embodiments of the present invention include, but are not limited to, those optical substrates as described previously herein, such as, plano lenses, prescription lenses, which in each case can be finished lenses, unfinished lenses, or lens blanks.

An initial step in the use of the spin coater 10, in accordance with some embodiments of the present invention, involves loading (see reference or step 12 of FIG. 2) the optical substrates (such as optical substrates 52) into a surface treatment chamber, such as plasma chamber 14. The plasma surface treatment conducted within chamber 14 can be selected from one or more art-recognized plasma surface treatment methods including, but not limited to, corona treatment, atmospheric plasma treatment, atmospheric-pressure treatment, flame plasma treatment, and/or chemical plasma treatment. With some embodiments, the surface treatment conducted in chamber 14 is an oxygen plasma treatment. The plasma treatment(s) conducted in chamber 14 are, with some embodiments, as described previously herein. The loading step 12 allows an operator to visually inspect the optical substrates (or lenses) for defects or damage before the process is begun. If dirt is visible the operator can clean the lenses by hand prior to placement into the plasma chamber 14 where they will undergo plasma treatment. The hand cleaning step can, with some embodiments, be conducted with deionized air. With some alternative embodiments, the operator can wipe the lenses, as needed, with one of several cleaning agents such as alcohol (such as isopropanol), or aqueous isopropanol, or an aqueous detergent.

Following the plasma surface treatment in chamber 14, the surface treated optical substrates are removed at step 16 and can optionally be subjected to visual and/or automated inspection prior to placement onto a loading unit 20 of spin coater 10. The optical substrates are forwarded along a path of travel 22 on loading unit 20, which can be achieved by way of a conveyer, such as a conveyer belt. The optical substrates are forwarded along path of travel 22, until they engage a positioning pocket 24. The loading unit 20 queues the optical substrates, and prevents the optical substrates from damaging each other (such as by engaging/rubbing/knocking each other) while sequentially presenting and introducing each individual optical substrate into positioning pocket 24. The edges of the positioning pocket 24 are configured, such as angled, to position each individual optical substrate in a pre-selected position (such as a centered position or location) relative to the width of the positioning pocket. Positioning pocket 24 also includes, with some embodiments, at least one (such as at least two) proximity sensors (such as beam breaking sensors 26) that identify the leading edge and/or trailing edge of each individual optical substrate, and cause the conveyor to stop when the optical substrate is sensed and determined to be properly positioned (such as centered) within positioning pocket 24.

Positioning pocket 24 allows spin coater 10 to be automated with a pick and place robotic arm 18 (shown only in FIG. 1). Robotic arm 18 engages the optical substrate in a manner that maintains a known center position of the optical substrate, such as within about 2 mm, throughout the process steps conducted in spin coater 10. The known center position of the optical lens can be so maintained as a result of a combination of, the accuracy of robotic arm 18, and the proper initial positioning of the optical substrate by and within positioning pocket 24, with some embodiments. The use of a pick and place robotic arm 18 allows spin coater 10 to be fully automated within the envelope (or operating reach) of robotic arm 18, and minimizes damage to, such as marking of, the surfaces of the optical substrate, compared to a manual process, such as a fully manual process.

The optical substrate can be wet or dry when picked up by robotic arm 18. With some embodiments, when wet, the optical substrate includes one or more wet coating layers thereon that are not hard, such as being tacky and/or uncured. With some further embodiments, when dry, the optical substrate is free of coating layers or includes one or more dry coating layers that are hard (and not tacky), such as being cured. In accordance with some embodiments, a lower portion of the gripper elements of robotic arm 18 engage and secure the optical substrate during wet pick up thereof (when the optical substrate is wet). With some further embodiments, upper portions of the gripper elements of robotic arm 18 engage and secure the lens during dry pick up thereof (when the optical substrate is dry).

The placement at step 12 into chamber 14 and removal from chamber 14 at step 16 can each be automated with an additional pick and place robotic arm (or the same pick and place robotic arm 18), which moves the positioning pocket 24 (or other positioning mechanism) upstream of chamber 14, with some embodiments. The use of an operator at chamber 14 allows for visual inspection of the optical substrates both before placement in and after removal from chamber 14, and allows for human oversight and control over spin coater 10 during operation thereof, with some embodiments. Art-recognized automated inspection procedures and equipment can be used to inspect the optical substrates before and/or after treatment thereof in chamber 14 in conjunction with or in place of manual inspection thereof, with some embodiments.

Robotic arm 18 moves the optical substrate (such as optical substrate 52) in step 28 to an optional washing and drying station 30, with some embodiments. With some embodiments, robotic arm 18 places the optical substrate on a rotatable chuck 40', which can be a rotatable vacuum chuck 40' with some embodiments, within the washing and drying station 30. Rotatable chuck 40' is programmable and can rotate at high speeds, such as up to 4,000 rpm, with some embodiments. After securing the optical substrate onto rotatable chuck 40', a top 32 (or lid) is slid to a closed position aligning high pressure water spray nozzles 34 with the optical substrate held on the rotating chuck 40'. The high pressure water spray nozzles are angled relative to the surface, including the edge, of the optical substrate held on the rotating vacuum chuck 40' for the purposes of cleaning the optical substrate, with some embodiments. In this manner the entire upper surface and edge of the plasma treated optical substrate can be cleaned, such as with deionized water under conditions of elevated pressure, such as about 1,000 psi, with some embodiments. Rotatable chuck 40' can rotate during spray washing to assure even cleaning of the optical substrate surface. The washing parameters, such as liquid pressure, washing time, and rotating speed can be programmable and can vary based on parameters, such as the type and/or size of the optical substrate, plasma treatment, and/or subsequent coating processes.

Following washing, the optical substrate can, with some embodiments, be dried in station 30 by one or more drying methods including, but not limited to, high speed rotation of the rotatable chuck 40' and/or high speed air nozzle(s) (not shown), which can be filtered air nozzles. The drying parameters can be programmed in a manner similar to those associated with the washing parameters, with some embodiments.

Following washing and drying in station 30, the top 32 is slid to an open position, robotic arm 18 reengages the optical substrate on rotatable chuck 40', and robotic arm 18 moves the optical substrate in step 48 to and mounts the optical substrate on the rotatable chuck 40 in the coater bowl 50, which can be a rotatable vacuum chuck 40 with some embodiments. The rotatable chuck 40 is configured to receive the optical substrate within coater bowl 50 and configured to rotate the optical substrate during coating, the speed and timing of which can vary depending upon parameters including, but not limited to, the coating and optical substrate.

The coater bowl 50 is configured to collect: excess coating material expelled from the optical substrate that is applied therein; and/or expelled during purging of the reservoirs 80 discussed further herein; and/or cleaning materials that are periodically utilized to clean coater bowl 50 (such as at the end of the week, or day, or shift). The spin coater 10 used with various embodiments of the present invention is effective as a once through system for small scale production, with some embodiments. A once through system means that the collected materials need not be recirculated and thus the collected material from coater bowl 50, can be removed through a drain (not shown), need not be segregated or processed for reuse. A once through system allows for the efficient change out of the distinct coating materials, with some embodiments.

The spin coater 10 that can be used with various embodiments of the present invention includes, with some embodiments, an indexable coating reservoir platform 60 containing a plurality of coating reservoirs 80. Each coating reservoir, with some embodiments, can each independently contain the curable photochromic coating composition(s), the curable protective coating composition(s), and optionally one or more additional and optional coating compositions. Indexable coating reservoir platform 60 is configured to index a selected reservoir 80 into a dispensing position above coater bowl 50, so the contents of the reservoir 80 can be dispensed with a dispensing unit 70 at the dispensing position. The dispensing unit 70 is engagable with the selected coating reservoir 80 in the dispensing position to dispense a select (or pre-determined) amount of first organic solvent or coating composition from the engaged and selected coating reservoir 80.

The indexable coating reservoir platform 60 is a rotatable carousel having distinct circumferential positions, in which each distinct circumferential position reversibly receives one of the plurality of coating reservoirs 80 (which can be disposable), with some embodiments. The carousel can, with some embodiments, include eight- or ten-stations. The carousel can have other numbers of positions for reservoirs 80, with some further embodiments, such as, but not limited to, eighteen- or twenty-stations. The rotating carousel as shown represents an efficient embodiment for forming and operating the indexable coating reservoir platform 60. Other indexing arrangements, however, can be used in accordance with the spin coater used with various embodiments of the present invention. For purposes of non-limiting illustration, a linearly moving rack or line of reservoirs 80 can be used for forming platform 60, with no limit on the number of distinct reservoirs 80 that can be present in such an arrangement. The motor rotating the platform 60 can utilize a variety of art-recognized alignment mechanisms, such as a spring biased detent locking mechanism, to assure the held reservoirs 80 are moved into precise and predetermined indexed positions such that the reservoir 80 is in the dispensing position below and aligned with the dispensing unit 70.

Each coating reservoir 80 includes an elongated barrel (not shown) containing a moveable piston (not shown) for dispensing of coating material (such as the curable photochromic coating composition and the curable protective coating composition) from the coating reservoir 80, and in which advancement of moveable piston of the selected coating reservoir 80 in the dispensing position dispenses coating material from the selected coating reservoir 80, with some embodiments. With some embodiments, each coating reservoir 80 is formed as a disposable plastic syringe and thus each coating reservoir 80 dispenses coating through a valve-less dispensing orifice positioned at the distal end of the barrel. Plastic syringes are commercially available and are particularly well suited to form reservoirs 80 due to the precise dispensing characteristics associated therewith. Caps (not shown) on the rear surface and across the valve-less dispensing orifice can be used for shipping of filled reservoirs 80, with some embodiments. The caps can also be reapplied for removal and storage of reservoirs 80, with some further embodiments.

With some embodiments, each reservoir 80 is adapted for the printing of human and/or machine readable identification indicia on the optical substrate, such as, but not limited to bar codes, QR codes, and/or matrix codes. Machine readable identification indicia can include information relating to, the coating identification, the coating parameters associated with a particular coating material, and/or the type of optical substrate, with some embodiments. The coating parameters can include, with some embodiments, one or more of: the unit dosage of coating material for a given substrate (such as from 0.2 ml to 0.6 ml for conventional lens coatings); the rate of dispensing; the dispensing pattern (such as, start in the center of the vacuum chuck held substrate and move out, vice versa, or some other varied dispensing position); the speed of the vacuum chuck 40 (sometimes called spread speed); and/or the time of rotation (also called spread time).

The narrow distal orifice of reservoir 80 (with some embodiments in combination with the movable piston 84) allows the coating material to be held in the reservoir and dispensed in the absence of a valve. With some embodiments, the valve-less dispenser of reservoir 80 substantially eliminates (except for a single purge drip/drop) priming which is necessary with other spin coater dispensers, and greatly reduces the amount of waste formed during operation of spin coater 10.

Dispensing unit 70 includes a rod 72 aligned with the selected reservoir 80 in the dispensing position and is configured to selectively advance the moveable piston (not shown) of the selected coating reservoir 80 in the dispensing position to dispense a select (or predetermined) unit amount of coating material from the engaged selected coating reservoir 80. With some embodiments, rod 72 is a screw, such as an elongated screw. Rod 72 can be controllably driven by a stationary motor (not shown). With some embodiments, the select (or predetermined) unit amount of coating material dispensed is from 0.2 ml to 4 ml, or from 0.2 to 1 ml, or from 0.2 ml to 0.6 ml. The unit amount includes a coating amount and a purge amount (such as a drop) and can vary depending on parameters, including but not limited to, the coating material, the substrate characteristics, the desired coating thickness, and coating protocol.

In accordance with some embodiments of the present invention, rod 72 is a stationary rod and the motor (not shown) associated therewith is moveable, such as vertically moveable, along rod 72. The motor can include an extension (not shown) that engages abuttingly with the piston of the barrel of the reservoir 80. Controllable movement of the motor, such as vertically downward, along the stationary rod serves to drive the piston 84 into reservoir 80, which results in dispensing of a select (or predetermined) amount of coating material from the distal valve-less orifice thereof, with some embodiments.

In operation, and with some embodiments, the indexable coating reservoir platform 60, the reservoirs 80, and the unit 70 are moveable as a unit, shown schematically at 78, at least between: (i) a purge position, where the selected coating reservoir 80 in the dispensing position is above the coater bowl 50 but is not above the optical substrate or lens; and (ii) at least one dispensing position, where the selected coating reservoir in the dispensing position above the coater bowl is above the optical substrate. The coater bowl 50 can be constructed to include a trough or extension (not shown) that extends to a point aligned with the purge position. In the purge position the movable piston is advanced by rod 72 of unit 70 to dispense a minimal purging drop of the coating material to clear the outer surface of the meniscus of coating material at the distal valve-less orifice of reservoir 80. The outer surface of the meniscus can be exposed to air during non-use of the coating material in a given reservoir 80, which can result in oxidation and/or fouling the meniscus, thus requiring purging thereof. A single drop is all that is required to prime the coating material distribution system by purging the possibly non-homogeneous portion of the coating material from the distal orifice, with some embodiments. Following the initial purge drop, the indexable coating reservoir platform 60, the reservoirs 80, and the unit 70 are moveable as a single unit, shown schematically at 78, to at least one dispensing position where the selected coating reservoir 80 in the dispensing position above the coater bowl 50 is above the optical substrate.

With some embodiments, the distal orifice is dimensioned so that the coating material within the barrel of reservoir 80 does not flow out therefrom, in the absence of the movable piston therein being positioned (or moved) within the barrel towards the distal orifice thereof. With some embodiments, the distal orifice is circular and has a diameter of less than or equal to 3.18 mm (⅛ inch).

The movement 78 of the selected dispensing reservoir 80 allows the spin coater 10 to accommodate a variety of dispensing protocols for coating the optical substrate on rotatable chuck 40 within coater bowl 50. With some embodiments, the coating material (such as the curable photochromic coating composition or the curable protective coating composition) from the selected dispensing reservoir 80 can be dispensed on the optical substrate at the center, and/or at one or more select positions across the surface of the optical substrate (such as in a line, spiral, and/or concentric circles, across/on the upper surface of the optical substrate), and then the rotatable chuck 40 is engaged to spin the applied coating material to form a coating layer (such as a curable coating layer) having substantially uniform thickness. In accordance with some further embodiments, concurrently with spinning of rotatable chuck 40, the coating material from the selected dispensing reservoir 80 is dispensed on the optical substrate at the center, and/or at one or more select positions across the surface of the optical substrate to form a uniform coating. Any desired combination of these dispensing and spinning protocols can be used with the spin coater 10. Additionally the dispensing rate and the spinning speed can also be varied throughout the process, with some embodiments. Intermittent dispensing and/or spinning of the vacuum chuck can used with some embodiments. The dispensing protocols are, with some embodiments, based upon parameters including, but not limited to, the substrate composition and/or surface treatment thereof, the coating material applied, and/or the desired final coating parameters.

The indexable platform 60 allows the spin coater 10 to apply a single or multiple coating layers on the optical substrate without removing the lens from the rotatable chuck 40. With some embodiments of the method of the present invention, and for purposes of non-limiting illustration, in a first stage, a curable photochromic coating composition is applied to a surface of the optical substrate using a first reservoir 80, so as to form a curable photochromic layer on/over the optical substrate. Next, the carousel is indexed, such that in a second stage a curable protective coating composition is applied over the curable (or at least partially cured) photochromic layer, from a distinct/separate second reservoir 80. Optionally, the carousel can be further indexed, such that in a third stage an optional further coating composition (such as a curable hard-coat composition) is applied over the previously applied curable (or at least partially cured) protective coating layer, from a distinct/separate third reservoir 80. The indexing of the carousel can be done with the platform 60 moved away from alignment of the reservoirs 80 with the optical substrate, so no stray drips from intermediate reservoirs 80 interfere with the desired coating protocol, and so that, for example, in the second stage the curable protective coating composition can be properly purged before dispensing over the curable (or at least partially cured) photochromic layer. Having two or more coating stages allows the spin coater, in accordance with some embodiments of the present invention, to apply and form numerous combinations of stacked coating layers, in which each coating layer thereof has the same or different composition and/or the same or different thickness relative to an adjacent (or abutting) coating layer.

In accordance with some embodiments of the present invention, the spin coater includes or has integrated therewith of at least one distinct curing station (such as curing stations 92, 94, and 96) for selectively and independently curing (such as at least partially curing) each coating layer applied to/formed over the optical substrate. The spin coater includes or has integrated therewith, with some further embodiments, a plurality of distinct curing stations (such as two or more curing stations, such as curing stations 92, 94, and 96) for selectively and independently curing (such as at least partially curing) each coating applied to the optical substrate. Following the application of the desired coating material/composition at coating bowl 50, robotic arm 18 reengages the optical substrate and moves it, at step 88, to a designated curing station (92, 94, or 96). With some embodiments of the present invention, each curing station independently includes at least one of: (i) a thermal curing station 96; (ii) a UV curing station 94; (iii) an IR curing station 92; and (iv) combinations of at least two of (i), (ii), and (iii).

The UV curing station 94 (of FIG. 1) of the flexible spin coater 10 includes a sliding drawer and a rotatable chuck 40" (which can be a rotatable vacuum chuck 40" with some embodiments) for selective receipt of a desired optical substrate to be cured. A concave or angled reflective mirror (not shown) can surround rotatable chuck 40" to assist or improve in edge curing, with some embodiments. With a coated optical substrate on rotatable chuck 40" of UV curing station 94, the drawer is closed and a shutter opened to expose the coated optical substrate to UV light (such as from a mercury or metal halide bulb) within UV curing station 94. Rotatable chuck 40" can rotate at slow speeds within UV curing station 94 to further assure a uniform cure, with some embodiments. The curing time within UV curing station 94 can vary depending on, for example, the particular coating. The IR curing station 92 can have a similar construction as UV curing station 94, but includes an appropriate IR source. The curing time within IR curing station 92 can also vary depending on, for example, the particular coating. Each curing station, with some embodiments, can include therein an atmosphere selected from an inert atmosphere (such as, but not limited to, argon and/or nitrogen) and/or a reactive atmosphere (such as, but not limited to, oxygen, CO, and/or $CO_2$).

The thermal curing station 96, with some embodiments, is accompanied (or associated) with a throughput conveyor 98 and a discharge or accumulation area 100. In the thermal curing station the optical substrates to be thermally cured are placed on the input conveyer, such as side-by-side on conveyor 98. The speed of the conveyor is selected so the coated optical substrates have a desired temperature exposure within curing station 96. The oven of thermal curing station 96 can, with some embodiments be an electric oven and/or a gas fired oven (such as a natural gas fired oven). The curing times and temperature profiles can vary depending on, for example, the coating that is to be cured. With some embodiments, the coated optical substrates are exposed to a temperature of 115°-135° C. for 20-40 minutes, such as 30 minutes at 125° C. for 30 minutes within the thermal curing station. Following at least partial curing, the coated optical substrates are forwarded to an accumulation area 100 designed to accommodate a desired number of optical substrates with no edges touching there-between (such as, but not limited to, up to 30 coated optical substrates), with some embodiments.

With some embodiments, conveyor 98 in concert with robotic arm 18 is used for egress of at least partially cured coated optical substrates from the IR curing station and/or the UV curing station. With some embodiments, a separate exit conveyor (not shown) is used to bypass the thermal curing station 96 for purposes of delivering coated optical substrates to accumulation area 100.

In accordance with some further embodiments, an optical substrate can be washed, then coated, then re-washed, and then subsequently coated with the same or a different coating material before curing. With some additional embodiments, a coated and cured (or at least partially cured) optical substrate can be returned from a curing station (92, 94, or 96) to: (i) the washing and drying station; and/or (ii) coater bowl 50 for the application thereto of a subsequent coating material. An optical substrate can, with some embodiments, be moved from accumulation area 100 back to loading unit 20 for the subsequent application thereto or one or more coating materials.

In accordance with some embodiments of the present invention, an optical substrate is mounted on a rotatable chuck (such as rotatable chuck 40) of a spin coating bowl (such as spin coating bowl 50) of a spin coater (such as spin coater 10). A curable photochromic coating composition is then applied over a surface of the optical substrate with rotation of the optical substrate by the rotatable cuck (such as rotatable chuck 40), which results in the formation of a curable photochromic layer over the surface of the optical substrate. The curable photochromic layer is then at least partially cured, which results in the formation of an at least partially cured photochromic layer over the surface of the optical substrate. With some embodiments, the optical substrate with a curable photochromic layer over a surface thereof is moved from spin coating bowl 50 to a curing station (92, 94, and/or 96) by robotic arm 18. After at least partial curing in a curing station, the optical substrate with an at least partially cured photochromic layer thereover is then placed back on rotatable chuck 40 in coating bowl 50 by robotic arm 18, with some embodiments.

A curable protective coating composition is next applied over the curable (or at least partially cured) photochromic layer of the optical substrate with rotation of the optical substrate by the rotatable chuck (such as rotatable chuck 40), thereby forming a curable protective layer over the at least partially cured photochromic layer of the optical substrate. The curable protective layer is then at least partially cured, which results in the formation of an at least partially cured protective layer over the curable (or at least partially cured) photochromic layer of the optical substrate, with some embodiments. With some embodiments, the optical substrate with the curable protective layer over the at least partially cured photochromic layer is moved from spin coating bowl 50 to a curing station (92, 94, and/or 96) by robotic arm 18. After at least partial curing in a curing station, the optical substrate with the at least partially cured protective layer over the at least partially cured photochromic layer is then: (i) placed back on rotatable chuck 40 in coating bowl 50 by robotic arm 18, for the application thereto of one or more additional coating compositions (such as a curable hard-coat coating composition); and/or (ii) moved by robotic arm 18 to a curing station (92, 94, and/or 96) to fully cure the coating layers thereof, with some embodiments.

With some embodiments of the method of the present invention: the curable photochromic layer is at least partially cured by exposure to elevated temperature; and the curable protective layer is at least partially cured by exposure to actinic radiation. As discussed previously herein at least partial cure of the curable photochromic layer by exposure to elevated temperature (such as a temperature that is greater than ambient temperature, such as greater than 25° C.), such as in an IR curing apparatus (e.g., IR curing station/apparatus 92) and/or a thermal curing apparatus (e.g., thermal curing station/apparatus 96), with some embodiments. At least partially curing the curable protective layer by exposure to actinic radiation can, as discussed previously herein, be achieved by exposure of the curable protective layer to UV radiation, such as in a UV curing apparatus (e.g., UV curing station/apparatus 94).

In accordance with some embodiments, the curable photochromic coating composition is stored in a first reservoir, and the curable protective coating composition is stored in a second reservoir, in which the first reservoir and the second reservoir each separately reside on an indexable coating reservoir platform. The method further includes, with some embodiments: moving the first reservoir to a dispensing position to apply the curable photochromic coating composition over the surface of the optical substrate; and moving the second reservoir to the dispensing position to apply the curable protective coating composition over the at least partially cured photochromic coating layer.

With some embodiments, a curable coating composition can be applied directly over a curable coating layer, and then the stacked curable coating layers can be concurrently at least partially cured. For purposes of non-limiting illustration, the curable protective coating composition can be applied over the curable photochromic layer, thereby forming a curable protective layer over the curable photochromic layer. The stacked curable photochromic layer and curable protective layer can then be subjected to one or more curing operations, which can be conducted concurrently and/or sequentially, so as to form a stacked at least partially cured photochromic layer and an at least partially cured protective layer over the optical substrate.

The method of the present invention, with some embodiments, further includes: applying a curable hard-coat coating composition over the durable (or at least partially cured) protective layer, thereby forming a curable hard-coat layer over the at least partially cured protective layer; and at least partially curing the curable hard-coat layer, thereby forming an at least partially cured hard-coat layer over the curable (or at least partially cured) protective layer. The hard-coat layer can include a single layer or multiple layers each having the same or a different composition.

A curable hard-coat coating composition can be applied over the curable (or at least partially cured) protective layer of the optical substrate using spin coater 10, with rotation of the optical substrate by the rotatable chuck (such as rotatable chuck 40), thereby forming a curable hard-coat layer over the at least partially cured protective layer of the optical substrate. The curable hard-coat layer is then at least partially cured, which results in the formation of an at least partially cured hard-coat layer over the curable (or at least partially cured) protective layer of the optical substrate, with some embodiments. With some embodiments, the optical substrate with the curable hard-coat layer over the at least partially cured photochromic layer is moved from spin coating bowl 50 to a curing station (92, 94, and/or 96) by robotic arm 18. After at least partial curing in a curing station, the optical substrate with the at least partially cured hard-coat layer over the at least partially cured protective layer is then: (i) placed back on rotatable chuck 40 in coating bowl 50 by robotic arm 18, for the application thereto of one or more additional coating compositions; and/or (ii) moved by robotic arm 18 to a curing station (92, 94, and/or 96) to fully cure the coating layers thereof, with some embodiments.

In accordance with some embodiments, the curable photochromic coating composition is stored in a first reservoir, the curable protective coating composition is stored in a second reservoir, and the curable hard-coat coating composition is stored in a third reservoir, in which the first, second, and third reservoirs each separately reside on an indexable coating reservoir platform. The method further includes, with some embodiments: moving the first reservoir to a dispensing position to apply the curable photochromic coating composition over a surface of the optical substrate, thereby forming a curable photochromic layer on the optical substrate; moving the second reservoir to a dispensing position to apply the curable protective coating composition over the curable (or at least partially cured) photochromic layer; and moving the third reservoir to the dispensing position to apply the curable hard-coat coating composition over the curable (or at least partially cured) protective coating layer.

In accordance with some embodiments, the first reservoir, the second reservoir, and the third reservoir each independently include a valve-less dispensing orifice independently positioned at a distal end of each reservoir through which, in each case, the curable photochromic coating composition, the curable protective coating composition, and the curable hard-coat coating composition are each independently dispensed.

The method of the present invention further includes, with some embodiments, forming a polarizing layer, that can reside at any position within the resulting coating stack of the photochromic optical article. With some embodiments, the polarizing layer is: interposed between the surface of the optical substrate and the at least partially cured photochromic layer; and/or over the at least partially cured photochromic layer; and/or over the at least partially cured hard-coat layer.

The polarizing layer can be formed from a polarizing coating composition that includes one or more dichroic materials, including but not limited to art-recognized non-photochromic dichroic compounds and/or photochromic-dichroic compounds, with some embodiments. The polarizing coating composition can include components, such as, but not limited to, a curable resin component, optional additives, and optional solvent(s), as described previously herein with regard to the curable photochromic coating composition, with some embodiments. The polarizing coating composition can, with some embodiments, be applied using the spin coater 10 in accordance with those methods and processes as described previously herein with regard to application of the curable photochromic coating composition and the curable protective coating composition.

With some further embodiments, the polarizing layer is in the form of a pre-existing film that is applied over a surface of the optical substrate and/or a coating layer thereon. The polarizing film can be adhered to the optical substrate by an underlying adhesive layer and/or by thermal bonding, such as by art-recognized thermal pressure bonding methods.

The present invention is more particularly described in the following examples, which are intended to be illustrative only, since numerous modifications and variations therein will be apparent to those skilled in the art. Unless otherwise specified, all parts and all percentages are by weight.

EXAMPLES

Part 1. Preparation of Coating Compositions.

Photochromic Coating PC-1: A photochromic polyurethane coating composition was prepared by combining the ingredients listed in Table 1.

TABLE 1

| Component | Weight % |
|---|---|
| N-Methyl pyrrolidone (NMP) | 28.321 |
| Acrylic polyol[1] | 17.770 |
| DURANOL ® T5652[2] | 16.040 |
| TRIXENE ® BI7960[3] | 30.603 |
| K-KAT ® 348[4] | 0.483 |
| BYK ® 333[5] | 0.036 |
| SILQUEST ® A-187[6] | 1.914 |
| TINUVIN ® 144[7] | 0.966 |
| IRGANOX ® 245[8] | 0.966 |
| KEYPLAST ® Magenta RB[9] | 0.002 |
| Photochromic Dyes[10] | 2.899 |

[1]Made from free radical polymerization of Hydroxypropyl methacrylate (40.4%), Butyl methacrylate (57.6%) and Acrylic acid (2.0%) with a number average molecular weight of 5500 as determined by GPC with polystyrene standard and tetrahydrofuran diluent. Material reduced to 61% solids using dipropylene glycol methyl ether acetate.
[2]Polycarbonate diol from Asahi Kasei
[3]Dimethyl pyrazole blocked hexane diisocyanate biuret from Baxenden
[4]Bismuth carboxylate catalyst from King Industries
[5]Surfactant from BYKChemie
[6]Epoxy silane adhesion promoter from Momentive
[7]Hindered Amine light stabilizer available from BASF Company.
[8]Antioxidant available from BASF Company.
[9]A Magenta Dye available from Keystone Aniline Corporation
[10]A mixture of naphthopyran photochromic materials in proportions designed to give a gray tint to the coating when activated by UV radiation.

Protective Coating Layer PL-1: A coating composition including an allophanate acrylate was prepared by mixing the components listed in Table 2.

TABLE 2

| Material | Amount (g) |
|---|---|
| 1,12-dodecanediol dimethacrylate | 15.57 |
| Tetrahydrofurfuryl acrylate | 19.6 |
| DOUBLEMER ® 9122[1] | 16.48 |
| IRGACURE ® 819[2] | 1.15 |
| PRO11300[3] | 7.71 |
| DESMOLUX ® XP2740[4] | 17.41 |
| MIRAMER ® SC9610[5] | 12.23 |
| BYK ® 348[6] | 0.03 |
| 3-Aminopropyl trimethoxysilane | 4.9 |
| DAROCUR ® 4265[7] | 1.15 |
| DAROCUR ® 1173[8] | 1.15 |
| GENOCURE ® MBF[9] | 1.15 |
| MIRAMER ® SC1400[10] | 1.47 |

[1]Hydroxypivaloylhydroxypivalate diacrylate available from Double Bond Chemical Ind.
[2]A photoinitiator available from BASF
[3]An epoxy acrylate oligomer available from Sartomer
[4]An aliphatic allophanate based on urethane acrylate available from Allnex Belgium.
[5]A melamine acrylate available from Miwon Specialty Company, Ltd.
[6]A surfactant available from BYK Chemie
[7]A photointiator available from BASF Company
[8]A photointitator available from BASF Company
[9]A photointiator available from Rahn USA Corp.
[10]Phosphate methacrylate available from Miwon Specialty Company, Ltd.

Protective Coating Layer PL-2: A coating composition including an allophanate acrylate and a melamine resin was prepared by mixing the components listed in Table 3. The resulting coating was placed into a reservoir of a spin coater.

TABLE 3

| Material | Amount (g) |
|---|---|
| 1,12-dodecanediol dimethacrylate | 15.57 |
| Tetrahydrofurfuryl acrylate | 19.50 |
| DOUBLEMER 9122 | 11.42 |
| IRACURE 819 | 1.15 |
| RESIMENE ® 718[1] | 5.00 |
| PRO11300 | 7.71 |
| DESMOLUX XP2740 | 17.41 |
| MIRAMER SC9610 | 12.23 |
| BYK 348 | 0.03 |
| MODAFLOW ® 9200[2] | 0.15 |
| 3-Aminopropyl trimethoxysilane | 4.90 |
| DAROCURE 4265 | 1.15 |
| DAROCURE 1173 | 1.15 |
| GENOCURE MBF | 1.15 |
| MIRAMER SC9610 | 1.47 |

[1]An iminotype melamine resin available from INEOS Melamines
[2]An acrylic flow modifier available from Cytec Industries, Inc.

Protective Coating Layer PL-3: An acrylate coating was prepared according to Example 1, Table 1 in U.S. Pat. No. 7,410,691.

Part 2. Preparation of Substrates.

All examples described below used as substrate 0.50 base 76 mm semi-finished single vision Polycarbonate lenses, obtained from Gentex Optics. Prior to spin coating, each lens was subjected to an oxygen plasma treatment using a PE-50 model plasma cleaner, purchased from PlasmaEtch, Inc. The plasma cleaning was performed using the settings listed in Table 4.

TABLE 4

| PE-50 plasma etch settings | |
|---|---|
| Pressure | 300 mtorr |
| Oxygen Flow | 7 sccm |
| Plasma | 120 W 13.56 Mhz RF |
| Generator | Power Supply at 100% |
| Treatment Time | 3 Minutes |

Part 3. Preparation of Coated Substrates.

The photochromic coating composition PC-1 was applied to the plasma treated substrates by spin coating to achieve a target film thickness of 20 microns. The coated substrates were cured in a convection oven for one hour at 125° C. Once cooled to room temperature, the coated substrates were reintroduced into the plasma cleaning chamber and subjected to the same treatment outlined above.

The resulting photochromic lenses were subsequently coated with a protective coating layer. For each example, 1.5 mL of the respective coating layer was dispensed onto the cleaned surface of the photochromic lens, and subjected to the spin parameters according to Table 4.

TABLE 4

| Spin coating parameters for protective coating layers | | | |
|---|---|---|---|
| Example | Protective coating | Spin time (sec) | Spin speed (rpm) |
| 1-A | PL-1 | 15 | 2500 |
| 1-B | PL-1 | 15 | 2500 |
| 2-A | PL-2 | 15 | 2500 |
| 2-B | PL-2 | 15 | 2500 |
| CE-1 | PL-3 | 4 | 1200 |
| CE-2 | PL-3 | 4 | 1200 |

Each of the lenses was cured in a UV oven using a conveyor system outfitted with standard D bulbs providing the Intensity and dose described in Table 5. Examples were either cured in a Nitrogen atmosphere in which the oxygen level maintained at or below 150 ppm, or in an oxygen rich (i.e., unaltered, ambient air) environment. After exposure to the UV oven, the coatings were tested qualitative for tackiness, and quantitatively for hardness. Harness values were measured using a Fischer Microhardness Unit Model H100C XYm at a penetration depth of two microns after a 100 Newton load for 15 seconds. Table 6 lists the results. Fisher microhardness values reported are the average of three readings at different locations on the same lens surface.

TABLE 5

UV cure conditions for protective coating layers.

| | Intensity (W/cm$^2$) | Dose (J/cm$^2$) |
|---|---|---|
| UV A | 1700 | 5.59 |
| UV B | 0.372 | 1.305 |
| UV C | 0.002 | 0.008 |
| UV V | 0.0998 | 3.316 |

TABLE 6

Properties of cured photochromic lenses with protective coatings.

| Example | UV cure atmosphere | Tackiness | Fischer Microhardness (N/mm$^2$) |
|---|---|---|---|
| 1-A | Ambient | No | 67 |
| 2-A | Ambient | No | 62 |
| CE 1-A | Ambient | Yes | Too soft to measure |
| 1-B | Nitrogen | No | 70 |
| 2-B | Nitrogen | No | 63 |
| CE 1-B | Nitrogen | No | 70 |

The present invention has been described with reference to specific details of particular embodiments thereof. It is not intended that such details be regarded as limitations upon the scope of the invention except insofar as and to the extent that they are included in the accompanying claims.

What is claimed is:

1. A photochromic optical article comprising:
   (i) an optical substrate;
   (ii) a photochromic layer over a surface of said optical substrate, wherein said photochromic layer comprises a photochromic compound; and
   (iii) a protective layer over said photochromic layer, wherein said protective layer comprises a matrix comprising residues of an ethylenically unsaturated radically polymerizable material comprising at least one allophanate group.

2. The photochromic optical article of claim 1, wherein the photochromic layer comprises a matrix comprising urethane linkages.

3. The photochromic optical article of claim 1, wherein said photochromic compound of said photochromic layer is selected from the group consisting of indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, and diarylalkenylethenes and combinations of two or more thereof.

4. The photochromic optical article of claim 1, wherein said matrix of said protective layer further comprises residues of an aminoplast material.

5. The photochromic optical article of claim 1, wherein said matrix of said protective layer further comprises residues of a second ethylenically unsaturated radically polymerizable material that is free of allophanate groups.

6. The photochromic optical article of claim 1, further comprising a hard-coat layer over said protective layer.

7. The photochromic optical article of claim 1, further comprising a polarizing layer that is,
   interposed between said surface of said optical substrate and said photochromic layer, or
   over said photochromic layer.

8. The photochromic optical article of claim 1, wherein the photochromic optical article is a photochromic ophthalmic article.

9. A method of preparing a photochromic optical article comprising:
   (a) applying a curable photochromic coating composition over a surface of an optical substrate, thereby forming a curable photochromic layer over said surface of said optical substrate, wherein said curable photochromic coating composition comprises a photochromic compound;
   (b) at least partially curing said curable photochromic layer, thereby forming an at least partially cured photochromic layer over said surface of said optical substrate;
   (c) applying a curable protective coating composition over said at least partially cured photochromic layer, thereby forming a curable protective layer over said at least partially cured photochromic layer, wherein said curable protective coating composition comprises an ethylenically unsaturated radically polymerizable material comprising at least one allophanate group; and
   (d) at least partially curing said curable protective layer, thereby forming an at least partially cured protective layer over said at least partially cured photochromic layer.

10. The method of claim 9, wherein:
    said curable photochromic layer is at least partially cured by exposure to elevated temperature, and
    said curable protective layer is at least partially cured by exposure to actinic radiation.

11. The method of claim 9, wherein said at least partially cured photochromic layer comprises a matrix comprising urethane linkages.

12. The method of claim 9, wherein said photochromic compound of said curable photochromic coating composition is selected from the group consisting of indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, and diarylalkenylethenes and combinations of two or more thereof.

13. The method of claim 9, wherein said curable protective coating composition comprises an aminoplast material, and said curable protective layer is at least partially cured by exposure to actinic radiation and optionally elevated temperature.

14. The method of claim 9, wherein said curable protective coating composition comprises a second ethylenically unsaturated radically polymerizable material that is free of allophanate groups.

15. The method of claim 9, wherein said curable protective coating composition has a solids content of 95 percent by weight to 100 percent by weight, based on total weight of said curable protective coating composition.

16. The method of claim 9, further comprising:
applying a curable hard-coat coating composition over said at least partially cured protective layer, thereby forming a curable hard-coat layer over said at least partially cured protective layer; and
at least partially curing said curable hard-coat layer, thereby forming an at least partially cured hard-coat layer over said at least partially cured protective layer.

17. The method of claim 9, further comprising forming a polarizing layer, that is,
interposed between said surface of said optical substrate and said at least partially cured photochromic layer, or
over said at least partially cured photochromic layer.

18. The method of claim 9, wherein said photochromic optical article is a photochromic ophthalmic article.

* * * * *